Aug. 31, 1954

G. A. MATTHEWS 2,687,572

POLE-INSULATED WIRE CUTTER

Filed May 7, 1951

INVENTOR.

BY GEORGE A. MATTHEWS

Whittemore
Hulbert & Belknap
ATTORNEYS

Aug. 31, 1954   G. A. MATTHEWS   2,687,572
POLE-INSULATED WIRE CUTTER
Filed May 7, 1951   2 Sheets-Sheet 2
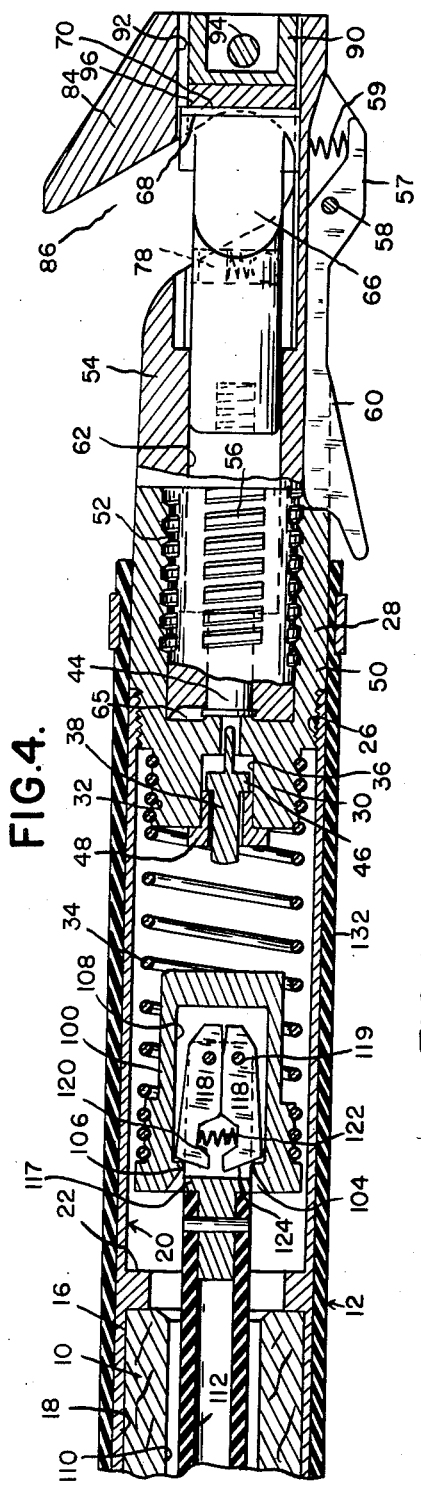
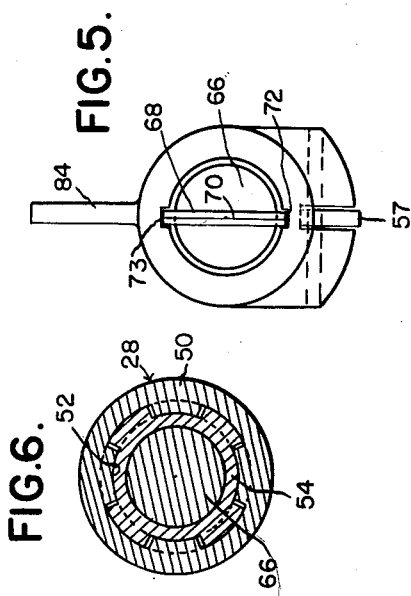
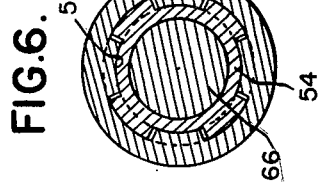
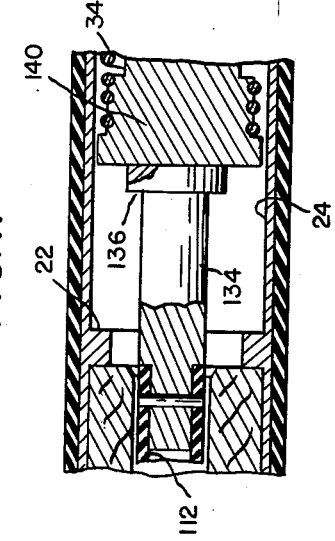
INVENTOR.
GEORGE A. MATTHEWS
BY Whittemore,
Hulbert & Belknap
ATTORNEYS

Patented Aug. 31, 1954

2,687,572

UNITED STATES PATENT OFFICE 2,687,572

POLE-INSULATED WIRE CUTTER

George A. Matthews, Detroit, Mich., assignor to The Detroit Edison Company, Detroit, Mich., a corporation of New York Application May 7, 1951, Serial No. 225,015

10 Claims. (Cl. 30—182)

The present invention pertains to wire-cutters in general, and more particularly to auxiliary powered cutters for safely cutting energized conductors.

This applicaton is related to my prior application entitled, "Protective Devices for Electrical Power Transmission Systems," Serial No. 39,153, filed July 16, 1948, now Patent Number 2,549,497, granted April 17, 1951.

Electrical faults on overhead electrical conductors usually cause the conductors to fall because the heat generated at the terminals of the fault-arc is sufficient to heat the conductor to the point of fusion.

Mechanical faults on an overhead line often result in fallen wires which may remain energized at a dangerous voltage. Lines are forcibly pulled down by falling trees or heavy limbs, or they may be broken due to an automobile colliding with the pole which supports the overhead line.

When the break in a conductor occurs in the span, due to either mechanical or electrical faults, the conductor may lie in and be supported by branches and limbs of trees, and in the case of multiple circuit lines, the broken conductor may tangle with and rest on the conductors of the other circuit. The severed conductor may be totally or partially supported by the above described conditions, but in the case where the conductor is only partially supported or unsupported, if the wire falls in the clear, at least one end then falls to or near the surface of the earth.

In any case, it is necessary for a lineman to climb a pole, and then reach out to cut-off the conductor near the pole in preparation for removing the dangling faulted wire. With the tools now available, it is necessary for the lineman to tug and push with the tool in order keep the conductor in the jaws of the tool, as well as during his application of the force to cut the conductor, especially so in cutting the larger size conductors. This tugging and pushing necessarily moves the faulted conductor around considerably, and this movement very often causes the dangling conductor to make electrical contact with other conductors causing an electrical arc which is dangerous to the lineman. This is the case even when insulated wires are involved, because the insulation is quickly deteriorated by weathering and usually is wet at this time, and tests show such insulation to be of little insulating value in these conditions. In other words, the insulation holds the conductors from making contact with each other, but a little movement of the conductors weakens the insulation and the dangerous arc results.

During periods of storm, when most conductor faults occur, the linemen are overly taxed with all kinds of emergency work. It is, therefore, desirable to put a tool in the hands of personnel who are not "climbers" so that fallen wires may be made harmless until such time that permanent repairs can be made by the pole-climbing personnel. In other words, capable men can be drafted from outside overhead line personnel who can travel a designated territory for the purpose of cutting off fallen wires eight to ten feet above the earth level, allowing the ends to hang from the cross arm at this safe height. This is particularly important when fallen wires occur adjacent to and across thoroughfares and highways. Such locations of fallen wires are common because most overhead lines are erected alongside public streets and roads.

As described above in some detail, the commercially available wire cutting tools are not satisfactory, because all such tools are clumsy to handle, slow in operation, and difficult to operate to the point of being impossible to operate for cutting the larger size conductors. In order to make them operable at all, various mechanical means, such as levers and cams, are employed to provide the high force required at the cutting jaw. These force increasing means necessarily add weight to the jaw-end of the pole, on which the cutter is mounted. Therefore, the person using the cutter must support the heavy end of the pole from the opposite end. This condition places particular importance on the requirement of a light-weight cutter-head. As pointed out before, the presently available energized wire cutters do not fulfill this requirement, whereas this invention does provide a light-weight cutter-head.

In order to increase the handling maneuverability, this invention makes it practical to employ a counterweight on the end of the pole opposite the cutting end, thereby making it possible for the user to support the cantilevered weight of the cutter-head, by holding the pole with one hand somewhere near the tripping trigger. The counterweight is somewhat heavier than the cutter-head, thereby effecting a balance point near the tripping trigger which is located in the section of the pole where the operator may safely hold the pole, thereby utilizing the insulation of the pole. This counterweight arrangement is not practical to use in combination with the heavier cutter-head, because the assembled pole with the still heavier counterweight becomes too heavy for handling.

In order to remove the hazard of a fallen wire and to restore service as well, at times it is desirable to have emergency personnel cut fallen wires. It is therefore necessary to put a tool in the hands of such personnel which does not require any appreciable degree of skill or strength usually acquired by years of experience. In other words, a good energized wire cutter should be a tool which can safely be used by experienced linemen and by trained emergency non-pole climbing personnel as well.

Fires on properties adjacent to overhead lines are also responsible to some extent for causing wires to fall. The overhead wires in the proximity of a fire are a hazard to the firemen fighting the fire. In order to safely and expeditiously fight these fires, the wires should be removed, and firemen cut the wires to remove the hazard of the live conductors. To do this cutting axes, bolt cutters or other available metal cutting tools are used; a practice which is extremely dangerous as compared to that with the use of my device. The tugging and pushing while attempting to cut the conductors with the present inadequate tool increases the hazard as herein before described. This invention provides a satisfactory tool for removing conductors in such occurrences.

A further requirement for an efficient energized wire cutter, is that the cutter-head should be of the type which, by design, positions the jaw over the wire for cutting. This requirement is not met in most of the present devices, particularly the bolt-cutter type. In the latter type, the wire tends to be moved out of the cutting jaws when the jaws start to apply their cutting pressure. This invention provides a device which by design positions the cutter and its anvil on opposite sides of the wire (hooking-on action) for severing the wire, with practically no weight on the wire.

A still further improvement is provided by this invention, whereby the exposed metal is minimized. This is important because, for all practical purposes, it is impossible to make accidental contact between an energized wire and ground, or between two or more energized wires or parts. In earlier devices, considerable metal is exposed, and the configuration of the old cutting mechanisms does not lend to ease of covering-up with rubber or other suitable insulation.

It is accordingly an object of the present invention to provide an auxiliary cutter for safely cutting energized conductors constructed and arranged to answer the requirements set forth in the foregoing.

Other objects and features of the invention will become apparent as the description proceeds, especially when taken in conjunction with the accompanying drawings, wherein:

Figure 4 is a sectional view similar to Figure 3 showing the hammer in position to fire a cartridge upon release.

Figure 5 is an end view of the wire cutter with parts removed for clarity.

Figure 6 is a section on the line 6—6, Figure 3.

Figure 7 is a fragmentary sectional view illustrating a modified construction.

Figure 1:
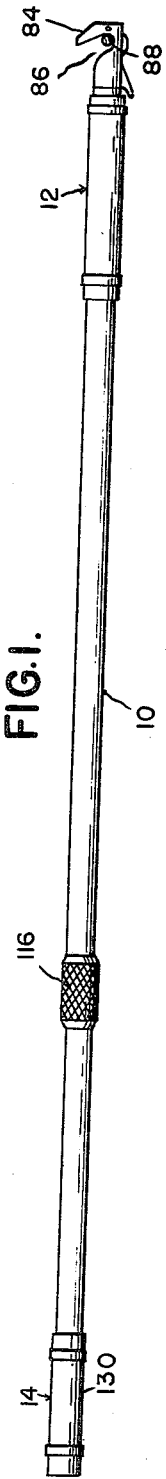
Figure 1 is a side elevation of my improved wire cutter.
Figure 2:
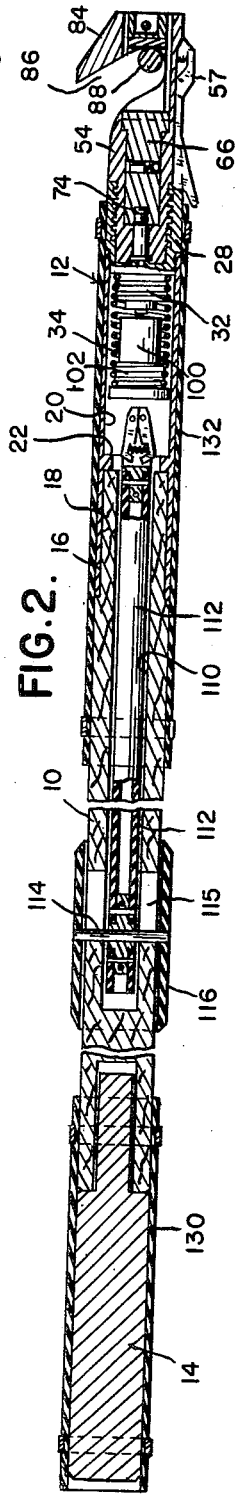
Figure 2 is a fragmentary enlarged longitudinal section thereof.
Figure 3:
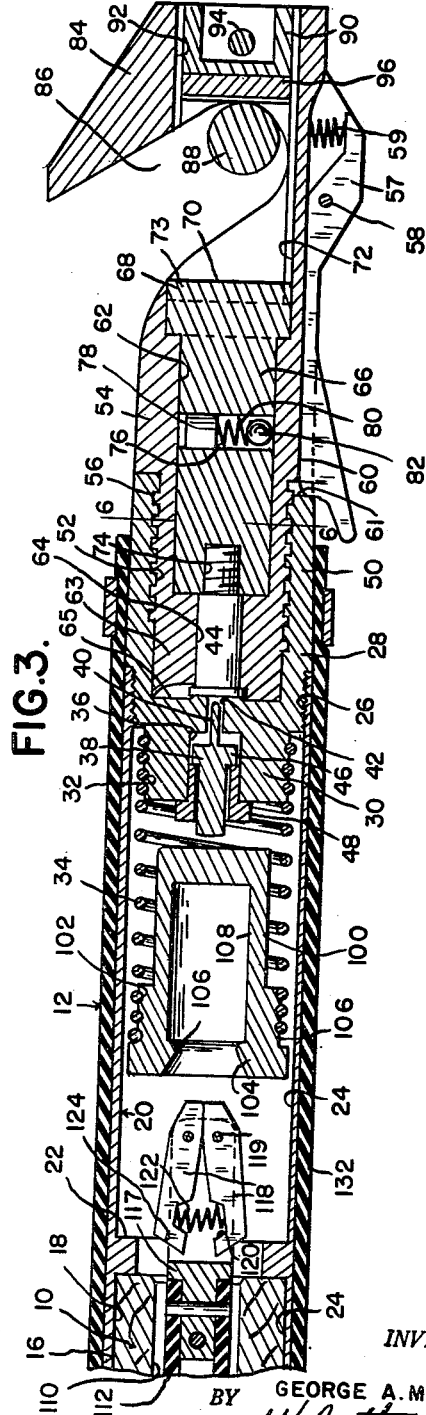
Figure 3 is a further enlarged sectional view of the end of the wire cutter showing the parts in neutral position.

Referring now to the drawings, Figure 1 illustrates the tool as comprising an elongated handle or pole 10 provided at one end with a wire severing head indicated generally at 12, and at the opposite end with a heavy balance weight 14. The forward end of the handle 10 is reduced as indicated at 16 and carries a rearwardly projecting sleeve portion 18 of a tube 20. The tube 20 includes an inwardly extending annular abutment 22 which engages the end of the handle 10 as best seen in Figure 3. Forwardly of the annular abutment 22 the tube 20 includes a second tubular portion 24 in which part of the operating mechanism is received. The forward end of the tubular portion 24 is threaded as indicated at 26 and engages a correspondingly threaded portion of an adaptor 28. Extending rearwardly of the threaded portion of the adaptor is a reduced portion 30 provided with external threads 32 thereon upon which convolutions of a tension spring 34 are threaded. The adaptor 28 is provided with a chamber 36 for the reception of a firing pin 38 including a forwardly extending reduced portion 40 adapted to operate through an opening 42 provided in the adaptor to engage a blank cartridge 44. The firing pin 38 includes an annular abutment 46 which cooperates with a fitting 48 received in the chamber 36 and the firing pin 38 is retained in the chamber thereby, limited longitudinal motion of the firing pin being permitted by the illustrated construction.

The adaptor 28 includes a forwardly extending sleeve portion 50 provided with interior interrupted threads 52 of the type best illustrated in Figures 4 or 6. Threads of this type permit separation between the parts upon a rotation of approximately 45 degrees and permit the parts to be rigidly assembled together upon a reverse rotation. A cutter-head 54 is provided having exterior interrupted threads 56 cooperating with the threads 52. A lever 57 is pivoted to the head 54 as indicated at 58 and is provided with a biasing spring 59. The rear portion of the lever 57 includes a portion adapted to be received within aligned grooves 60 and 61 located in the cutter-head and adaptor respectively. Thus, the lever 57 prevents inadvertent separation between the head and adaptor.

The head 54 includes a longitudinally extending chamber 62 substantially closed at the rear end of the cutter-head by a transverse wall 63. The wall 63 is provided with a chamber 64 for the reception of the blank cartridge 44, the rear end of the wall 63 being recessed to receive the flange of the cartridge, the recess including a laterally extending portion 65 to facilitate removal of the case after the blank cartridge has been fired.

Slidably mounted in the chamber 62 is a chisel 66. The left end of the chisel 66, as seen in Figure 3, is of circular cross-section and is freely slidable within the chamber 62. At its right hand end as seen in Figure 3, the chisel is provided with a transversely extending knife element 68 having a cutting edge 70. The knife 68 extends transversely beyond the main body of the cutter-head and serves to prevent rotation of the cutter-head in the chamber 62. For this purpose grooves 72 and 73 are provided in the cutter-head 54. At the rear end of the chisel 66 is provided a threaded recess 74 into which may be engaged a threaded tool for drawing the chisel into the position shown in Figure 3 after the same has been projected forwardly by firing cartridge 44. The tool is inserted through the cartridge chamber 64.

The chisel is provided with a transverse bore 76 closed at one end by a plug 78 pressed therein and including a coil compression spring 80. A ball 82 is received within the bore and is pressed by the spring into engagement with the inner surface of the chamber 62. This arrangement provides means for preventing the chisel 66 from moving away from the position directly adjacent the blank cartridge 44 prematurely.

The cutter-head 54 includes a hook portion 84 provided with an inclined relatively wide slot 86 adapted to be hooked over a line conductor 88. In line with the chisel 66 is an anvil 90 adapted to be retained in an opening 92 in the cutter-head and retained therein by a pin 94 or other suitable securing means.

In order to prevent injury to the cutting edge 70 of the chisel a soft metal cushion 96 is provided at the inner end of the anvil 90.

Slidably mounted in the tube 20 intermediate the abutment 22 and the rear end of the adapter 28 is a hammer 100. The hammer, as illustrated in Figure 3, is of hollow construction and includes a threaded portion 102 on which is threaded the opposite end of the spring 34. The rear open end of the hammer includes inclined camming surfaces 104 providing an annular lip 106 at the rear end of the enlarged chamber 108 therein.

The forward portion of the handle 10 includes a longitudinal bore 110 in which is slidably received an insulating tube 112, the rear end of which is coupled to a transverse pin 114 slidable in diametrically opposed axially extending slots 115. The ends of the pin 114 are received in a tripping sleeve 116 which is slidable longitudinally on the handle 10.

At its forward end the tube 112 carries a bifurcated body 117 to which are secured a pair of pivoted fingers 118, the pivot connections being illustrated at 119. The rear end of the fingers 118 are recessed to provide spring seats 120 for the reception of a compression spring 122 normally urging the rear ends of the fingers apart to the position illustrated in Figure 3.

Referring now to Figure 4 the same parts are illustrated in a different position. To bring the parts to the position shown in Figure 4 the tripping sleeve 116 will have been moved toward the cutter-head to cause the fingers 118 to enter the chamber 108 in the hammer 100. After the rear ends of the fingers 118 have entered the chamber, the spring 122 will force them outwardly to interlock with the hammer 100. The rear ends of the fingers 118 are inclined as indicated at 124 to operate with a cam action. At this time the tripping sleeve 116 is moved to the left as seen in Figure 1, drawing the tube 112 to the left which in turn draws the hammer 100 to the position shown in Figure 4. This results in tensioning the spring 34. Further movement of the tripping sleeve 116 to the left will eventually cause the hammer 100 to engage the abutment 22. At this time further movement of the tripping sleeve 116 to the left will cam the rear ends of the fingers 118 toward each other and will release the hammer. Tension of the spring 34 will cause the hammer to fly forwardly striking the firing pin 38 and detonating the blank cartridge 44. Explosion of the cartridge will of course force the chisel 66 forwardly with considerable force, thus severing the conductor 88.

Preferably, the balance weight 14 is covered by an insulating sleeve 130. In like manner a second insulating sleeve 132 is provided which extends from the forward end of the handle 10 to overlying relation with the forward end of the cutter-head 54.

Referring now to Figure 7 there is illustrated a modified construction in which the tube 112 is provided with a carrier 134 having a permanent magnet 136 secured thereto. In this case the hammer 140 may be solid and drawn to the rear by the attraction of the permanent magnet and the hammer. Release of the hammer from the magnet is effected when the hammer engages the abutment 22 and the magnet is withdrawn therefrom by the application of further force. Otherwise the operation of the device is the same.

The present arrangement is extremely simple to operate and due to the counterbalance construction offers no difficulty to the operator in engaging the hook portion 84 over the conductor to be severed. Moreover, accidental discharge of the blank cartridge is effectively prevented since in order to fire the cartridge it is necessary to draw the tripping sleeve 116 fully toward the rear of the handle 10. On the other hand, this does not require substantial force and may be readily accomplished by the user of the tool under difficult conditions.

Obviously of course, the length of the handle may be varied as desired, but in any case it is of sufficient length as to permit cutting off of a line conductor at sufficient height to render it safe.

Normally, the conditions which result in broken conductors occur during storms or the like and it is accordingly important that the tool be extremely simple, easy to manipulate, and not subject to mechanical failure. Moreover, it is contemplated that tools of this nature will be supplied to firemen, policemen, and the like, not necessarily experts in dealing with high voltage conductors. The present construction is perfectly insulated so that injury to the operator by accidental contact with the conductor is completely avoided.

The drawings and the foregoing specification constitute a description of the improved pole-insulated wire cutter in such full, clear, concise and exact terms as to enable any person skilled in the art to practice the invention, the scope of which is indicated by the appended claims.

What I claim as my invention is:

1. In a wire cutter of the character described, a chamber for receiving a blank cartridge, a body having an opening therein, a firing pin in said opening movable into firing relation to said cartridge, a hammer movable toward and away from said pin, a helical spring having one end fixed relative to said body and its other end fixed to said hammer, the spring being of a length such that said hammer is normally spaced from said pin, and movable means releasably engageable with said hammer for withdrawing said hammer from said pin to stress said spring, and means to prevent further withdrawal of said hammer beyond a predetermined position while said movable means continues its movement to release said hammer after substantial withdrawal from said pin for movement by said spring against said pin to fire said cartridge.

2. Structure as defined in claim 1 in which one end of said spring is connected to said body and the other end of said spring surrounds said hammer.

3. A wire cutter of the character described comprising a pole, a cutter-head at one end of said pole, said cutter-head having a hook for engagement over a wire, an anvil in said head in position to abut one side of a wire engaged by said hook, a chisel in said head reciprocable toward and away from said anvil, a chamber for receiving a blank cartridge at the rear of said head, an adaptor mounted at the forward end of said pole and having a recess for receiving the rear end of said head, said head and adaptor having threads interrupted by axially extending unthreaded portions operable to permit axial movement therebetween to release said head from said adaptor upon partial relative rotation, and means for firing said cartridge comprising a firing pin in said adaptor.

4. Structure as defined in claim 3, comprising in addition grooves in said head and adaptor which are aligned when said head and adaptor are threaded together, and a spring pressed latch including a part movable into said grooves to prevent accidental separation.

5. Structure as defined in claim 3 comprising in addition frictional means between said head and chisel opposing movement of said chisel, said chisel having a threaded recess in its rear end for engagement by a tool inserted through the cartridge chamber of said head to facilitate drawing said chisel toward said chamber.

6. In a wire cutter of the character described, firing mechanism comprising a firing pin, a hammer movable toward and away from said pin, resilient means operatively connected to said hammer opposing motion of said hammer away from said pin, said hammer having a recess in the end thereof remote from said pin, said recess having an inwardly extending annular flange at its outer end, hammer actuating mechanism comprising a slidable member, a pair of levers pivoted to said member and having free ends movable toward and away from each other, resilient means urging the free ends of said levers outwardly away from each other, said levers being movable into said recess beyond said flange, cam surfaces on the free ends of said levers engageable with the inner surface of said flange, and abutment means limiting movement of said hammer away from said pin whereby continued movement of said slidable member away from said pin cams said levers inwardly and releases said hammer for motion toward said pin.

7. A wire cutter comprising a long pole having a cutter-head at one end including a hook to engage over a wire to be cut, cutting mechanism in said head including firing mechanism for a blank cartridge, a weighted member at the other end of said pole to counterbalance the weight of said cutter-head, a slidable sleeve on said pole intermediate said weighted member and said head, and means connecting said sleeve and firing mechanism to sequentially energize and release said firing mechanism upon continuous movement of said sleeve in one direction.

8. A wire cutter comprising a long pole having a cutter-head at one end including a hook to engage over a wire to be cut, cutting mechanism in said head including firing mechanism for a blank cartridge including a reciprocable spring pressed hammer, a slidable sleeve on said pole remote from said head, releasable means connected to said sleeve operable to engage said hammer upon movement of said sleeve toward said head and then to draw said hammer away from the cartridge and to release said hammer upon movement of said sleeve away from said head, said releasable means comprising a spring pressed latch engaging said hammer and releasable therefrom under pressure, and an abutment engageable by said hammer upon movement thereof away from the head.

9. A wire cutter comprising a long pole, a cutter-head at one end thereof including a hook engageable over a wire, an anvil to abut one side of the wire, a chisel movable toward said anvil, means receiving a blank cartridge to actuate said chisel, means for firing the cartridge comprising a slidable sleeve at the other end of said pole, a hammer adjacent the cartridge, insulating means adapted releasably to connect said hammer and sleeve for actuation of said hammer by said sleeve, said pole being formed of insulating material, and an insulating sleeve extending over the forward exposed end of the pole and extending forwardly therefrom into proximity to said hook to prevent grounding or short-circuiting of the conductor being cut through conducting portions of the tool to ground or exposed conducting material adjacent the conductor being severed.

10. A wire cutter comprising a long pole having a cutter-head at one end including a hook to engage over a wire to be cut, cutting mechanism in said head including firing mechanism for a blank cartridge including a reciprocable spring pressed hammer, a slidable sleeve on said pole remote from said head, releasable means connected to said sleeve and operable to engage said hammer upon movement of said sleeve toward said head and then to draw said hammer away from the cartridge and to release said hammer upon movement of said sleeve away from said head, said releasable means comprising a magnet engaging said hammer, and an abutment engageable by said hammer upon movement thereof away from said head.

References Cited in the file of this patent

UNITED STATES PATENTS

| Number | Name | Date |
| --- | --- | --- |
| 598,778 | Green | Feb. 8, 1898 |
| 2,008,362 | Littlehale | July 16, 1935 |
| 2,017,329 | Temple | Oct. 15, 1935 |
| 2,042,934 | Gill | June 2, 1936 |
| 2,454,528 | Temple | Nov. 23, 1948 |
| 2,460,113 | Young | Jan. 25, 1949 |
| 2,494,287 | Darnell | Jan. 10, 1950 |
| 2,530,434 | Johnson | Nov. 21, 1950 |